United States Patent
Schoettl

(10) Patent No.: US 7,825,848 B2
(45) Date of Patent: Nov. 2, 2010

(54) METHOD WITH A SYSTEM FOR ASCERTAINING AND PREDICTING A MOTION OF A TARGET OBJECT

(75) Inventor: Alfred Schoettl, Munich (DE)

(73) Assignee: LFK-Lenkflugkoerpersysteme GmbH, Schrobenhausen (DE)

(*) Notice: Subject to any disclaimer, the term of this patent is extended or adjusted under 35 U.S.C. 154(b) by 252 days.

(21) Appl. No.: 12/104,701

(22) Filed: Apr. 17, 2008

(65) Prior Publication Data

US 2009/0322590 A1    Dec. 31, 2009

(30) Foreign Application Priority Data

Apr. 18, 2007    (DE) .................. 10 2007 018 190 U

(51) Int. Cl.
    *G01S 13/72*    (2006.01)
(52) U.S. Cl. .................. 342/62; 342/90; 342/95; 342/96; 342/97; 342/140; 342/195
(58) Field of Classification Search .............. 342/62, 342/90, 95–97, 106–109, 113–115, 133, 342/135, 139–141, 146–147, 195
See application file for complete search history.

(56) References Cited

U.S. PATENT DOCUMENTS

| | | | | |
|---|---|---|---|---|
| 4,220,296 A | | 9/1980 | Hesse | |
| 5,020,411 A | * | 6/1991 | Rowan | 89/1.11 |
| 5,631,653 A | * | 5/1997 | Reedy | 342/62 |
| 5,649,065 A | * | 7/1997 | Lo et al. | 706/22 |
| 5,660,355 A | * | 8/1997 | Waymeyer | 244/3.15 |
| 6,244,536 B1 | * | 6/2001 | Cloutier | 244/3.19 |
| 6,400,310 B1 | * | 6/2002 | Byrnes et al. | 342/115 |
| 7,487,933 B1 | * | 2/2009 | Chen et al. | 244/3.15 |
| 2006/0215880 A1 | * | 9/2006 | Berthilsson et al. | 382/103 |
| 2007/0098221 A1 | * | 5/2007 | Florin et al. | 382/103 |
| 2009/0312985 A1 | * | 12/2009 | Eliazar | 702/187 |
| 2009/0322590 A1 | * | 12/2009 | Schoettl | 342/62 |

OTHER PUBLICATIONS

"Hammerstein models for identification of stochastic systems", Automation and Remote Control, Bolkvadze-G-R., {Autom-Remote-Control-Russia}, Jan. 2003, vol. 64, No. 1, p. 37-48.*

"Semimartingal," Internet article from Wikipedia, de.wikipedia.org/w/index.php?title=Semimartingal&oldid=30611789&printable=yes.

* cited by examiner

*Primary Examiner*—John B Sotomayor
(74) *Attorney, Agent, or Firm*—Greenblum & Bernstein, P.L.C.

(57) ABSTRACT

Method, tracking system, and intercept missile for tracking highly maneuverable target objects. The method includes estimating the motion of the at least one target object via a mathematical method that includes a filter method relating to a model assumption for estimating at least one of the motion and an orientation of the target object. The filter method includes a semi-martingale algorithm for estimating motion.

19 Claims, 2 Drawing Sheets

METHOD WITH A SYSTEM FOR ASCERTAINING AND PREDICTING A MOTION OF A TARGET OBJECT

CROSS-REFERENCE TO RELATED APPLICATIONS

The present application claims priority under 35 U.S.C. §119(a) of German Patent Application No. 10 2007 018 190.8-53 filed Apr. 18, 2007, the disclosure of which is expressly incorporated by reference herein in its entirety.

BACKGROUND OF THE INVENTION

1. Field of the Invention

The invention relates to a method with a system for ascertaining and predicting a motion of at least one target object by using a mathematical method of estimation with the aid of a filter method relating to the model assumption for estimating the motion and/or orientation of the target object. The invention also relate to a system for performing the method.

2. Discussion of Background Information

So-called tracking systems, which are able to register a motion of an object by a model assumption, are known. These systems utilize so-called filter equations. A tracking system serves for guiding an interceptor missile that is intended to hit a target object, for example a ballistic target missile. A target object—for example, a ballistic target missile—is distinguished in that it does not have a propulsion unit of its own. Such a missile is designated in German technical language as an unmanned, autonomous flying vehicle, so that ordinary aircraft are not covered by this concept.

The filter equations permit filter methods that, in principle, are mathematical methods of estimation. Known filter methods accordingly use model assumptions for estimating the state of the target missile.

A filter solution that has been preferred up until the present time is based on a so-called Kalman filter or extended Kalman filter.

In the event of abrupt changes of state or abrupt changes in the flight motion of the target missiles, these methods have a poor performance as a rule.

Filters of this type are described in, for example, the publication by G. Minkler, J. Minkler: Theory and Application of Kalman Filtering, Magellan Book Company, Palm Bay, 1993.

Other known filters, such as the so-called particle filter or the unscented filter, also do not solve this problem.

Unscented filters are known from, for example, the publication by B. Ristic, S. Arulampalam, N. Gordon: Beyond the Kalman Filter, Artech House Publishers, Boston, 2004.

Because these filter methods do not permit, or only inadequately permit, the modeling of abrupt changes of state or changes of maneuver, the filters react sluggishly or defectively in the event of such maneuvers.

This is because the underlying model assumptions concerning the motion of the object cannot, for mathematical reasons, map random, discontinuous changes in the characteristics of the target objects, such as accelerations for example. In practice, non-linearities arise in addition, so that an estimation based on these methods is inaccurate.

In order to lessen this problem, it is known to provide an upstream application of integrity algorithms. In this case, use is made of a filter bank with several filters. If deviations of the predicted data, based on the model assumptions, from the measured data are too great, the measurements are discarded, or switching takes place to a different filter of the filter bank. By this means, although the problem can be alleviated in practice, the sluggishness still persists by reason of the behavior of the target object, which is difficult to model.

An interception of highly maneuverable targets such as ballistic missiles, in particular by an interceptor missile, is likewise rendered distinctly difficult in these cases, resulting in a low hit-rate of the interceptor missile.

SUMMARY OF THE INVENTION

The invention is directed to a method permitting an interception of highly maneuverable targets.

According to the invention, the method includes a filter method utilizing a semi-martingale algorithm, i.e. an algorithm based on model equations that can be represented by smooth semi-martingales, for estimating the motion.

The use, according to the invention, of stochastic process theory, which is based on semi-martingale theory, creates filters that are fit for practical use and improved in comparison with the state of the art for ascertaining both states of maneuver and transitions of maneuver. I this manner, it is possible for the hit reliability of an interceptor missile to be distinctly improved.

By virtue of the invention, targets of a different kind—discrimination—can also be recognized and differentiated. A detection of transitions of state, in particular a change in the configuration of the target—such as, for example, a change in aerodynamics, a change in behavior as a result of component faults or such like—is also possible.

The resulting filter equations lead to optimal results, whereby a solution of equations of the semi-martingale algorithm in the continuous case or in the case of a non-discontinuous change in the target merely requires the solution of a stochastic differential equation. A solution of equations can therefore be solved with relatively little computing capacity of a computer. Numerical inaccuracies are relatively slight.

In an advantageous further development of the method according to the invention, the invention provides that the motion is registered by a Markov process or semi-Markov process with the aid of stochastic differential equations. The application of these processes based on the general semi-martingale theory enables the creation of optimal filters. These also permit discontinuous processes—that is to say, discrete state transitions—in the modeling. The only requirement is a model that forms a smooth semi-martingale, this being a very general requirement and one that is easy to satisfy in practice.

A semi-martingale representation in the compensator and martingale portions is possible in straightforward manner.

In expedient manner, the Markov process has an associated indicator process of the form:

$$X_t = X_0 + \int \Sigma k \lambda_{Xs,k} ds + M_t, \text{ from 0 to t}$$

or $$dX_t = \Sigma k \lambda_{Xt,k} + M_t.$$

X is renamed as Y. Therefore the formula reads $$X_t = X_0 + \int \lambda_{Ys,i} ds + M_t, \text{ from 0 to t}$$

or $$dX_t = \lambda_{Yt,i} + M_t$$

In this case the simplest case is considered, in which the motion of the target object is completely described by the discontinuous process. This is the case, for example, if the target object assumes an acceleration that is discontinuous but constant between the discontinuities, each spatial dimension is considered separately, and a so-called tracking station measures the velocity of the target object. In the general case, the model includes a discontinuous process that describes the discontinuous change, and of a continuous model that builds upon the discontinuous process. This situation arises, for example, if an attacking missile suddenly changes its guidance method internally or the aerodynamics of the missile suddenly change, for example, as a result of flaps being extended or as a result of a section of the missile being jettisoned.

This situation will be described in more detail in the following:

By way of target-object model, a smooth semi-martingale X will be considered, $$dX_t = A_t dt + M_t$$

Semi-martingales are very general stochastic processes. For the application under consideration, the following specialization is expedient:

Let a discontinuous process Y be given, in the simplest case a Markov process. A target-object model can now frequently be described as follows as a stochastic differential equation:

$$dX_t = f(Y_t, X_t) dt + dM_t$$

where X is the process—inter alia the multidimensional process—to be modeled, Y is the underlying discontinuous process, and M is a martingale. The solutions X of this differential equation are again semi-martingales; therefore this form of modeling is a specialization of the above model.

In the simplest case the following model will be considered:

$$dX_t = f(Y_t) dt + dM_t$$

If Y is a Markov process as described above, then it is expedient to model X as an indicator function or as a vector of indicator functions over all indices i:

$$X = \mathbb{1}_{Y_t = i}$$

The indicator function is defined as follows:
$\mathbb{1}_A := 1$ if A holds, and $\mathbb{1}_A := 0$ if A does not hold.
In this case, the model accordingly results as $$dX_t = \lambda_{Y_t, i} + M_t$$

In this connection:
X=a state of the indicator process,
λ=a transition rate,
M=a martingale,
Y such a Markov process A measurement satisfies, in particular, a stochastic differential equation of the form:

$$dZ_t = F_t dt + \sigma_t dW_t$$

with the following meanings:
F and σ=an adapted stochastic process,
Z=a measurement or a measured value and
W=a Brownian motion An exact and optimal (implicit) filter equation can be derived in this way. For preferred target objects and other special cases which discrete state transitions that are modeled by a Markov process or semi-Markov process, closed formulae arise. Depending on the modeling, this enables, for instance, the rapid recognition of a target type or the estimation of the probability of the existence of a state or maneuver. For example, a discontinuous change in the aerodynamics of the missile to be hit can be quickly established.

For the purpose of solving these equations, a numerical integration method is preferably employed. This method can be processed efficiently with computers. These computations can be solved with relatively slight numerical inaccuracies.

In a preferred manner, the state Y of the discrete process is assigned to a state of a state automaton in a guidance-strategy module of the target object and/or to an index of target-types of target objects. As a result, on the one hand diverse target objects—for example, diverse ballistic missiles—can be reliably distinguished from one another and, on the other hand, a change—for example, in the flight property of the target object, for example as a result of discontinuous changes of the flaps or as a result of parts of the object being jettisoned—can be established, and an exact prediction of its flight motion can be predicted. This decisively enhances the hit reliability of an interceptor missile.

Changes of maneuver of the target object can be easily recognized by an explicitly solvable stochastic differential equation. For example, an interceptor missile can be appropriately adjusted to this change of maneuver in a short time, even during its flight motion. In this connection, mathematical principles, such as those concerning the theory of Brownian motion and the theory of semi-martingales, can be utilized.

An important advantage of these measures consists in the fact that the formulae are easily transferable into the multidimensional domain. An inverse calculation and advance calculation or, to be more exact, a smoothing and a prediction are possible in a manner similar to conventional filters.

Accordingly, it is highly favorable that the stochastic differential equations describe, inter alia, the mathematical probability of the existence of a maneuver of the target object, with computation data relayed immediately to an interceptor missile. Because ballistic missiles are able to move at very high speeds, with known methods it is difficult to hit the target by an interceptor missile. Through the accurate prediction of the flight motion of the target on the basis of the method according to the invention and this advantageous further development, the target can be hit. This applies, in particular, to target missiles having discontinuous changes of maneuver.

An air-defense system or a tracking system, for example, expediently operates on the basis of the invention. This system includes a measuring station, in particular a radar measuring station. The latter can, using proven technology, provide data pertaining to the target. A processing-and-control unit for processing measured motion data or flight data is programmed in accordance with the mathematical model. The unit exhibits, in particular, one or more microprocessors.

The invention is directed to a method for tracking highly maneuverable target objects. The method includes estimating the motion of the at least one target object via a mathematical method that includes a filter method relating to a model assumption for estimating at least one of the motion and an orientation of the target object. The filter method includes a semi-martingale algorithm for estimating motion.

According to a feature of the invention, the semi-martingale algorithm is an algorithm based on model equations representable by smooth semi-martingales.

In accordance with another feature of the instant invention, the method can also include ascertaining at least one of the motion and orientation by modeling with stochastic differential equations. The stochastic differential equation can be:

$$dZ_t = F_t dt + \sigma_t dW_t$$

where F and σ represent an adapted stochastic process, Z represents a measurement or a measured value, and W represents a Brownian motion.

According to another feature, the method may include ascertaining at least one of the motion and orientation by modeling with a discontinuous process, in which the at least one of the motion and orientation are determined by a numerical method. The discontinuous process can include one of a Markov process or semi-Markov process. Further, the method can include using indicator processes X of the form $X_t = 1]_{Yt=i}$ or $X_t = 1]_{Yt=i, \text{ additional condition}}$ of a discontinuous process Y that is usable for modeling according to the equation:

$$X_t = X_0 + \int \lambda_{Ys,s} ds + M_t, \text{ from 0 to t}$$

Where X is an indicator process, λ represents a transition rate, M represents a martingale, and Y represents such a Markov process. The method can also include assigning to at least one of a state in a state automaton in a computer of the target object and an index of types or configuration of target objects, a state Y of the discontinuous process. A conditional expectation of a drift process F of the model is ascertainable via the indicator process includes, $$E(F_t|\mathfrak{I}_t^Z) = \Sigma_i E(1]_{Yt=i} F_t | \mathfrak{I}_t^Z)$$

where $\mathfrak{I}_t^Z$ is the filtration generated by the measurement Z.

In accordance with still another feature of the present invention, differential equations describe a probability of an existence of a certain maneuver of the target object. The differential equations can include stochastic differential equations, and the target object comprises a flying target object.

In accordance with another feature of the invention, the target object may include a missile, and an interceptor missile can be controlled by the method.

According to another feature of the present invention, the motion can be discontinuous.

Further, the target object may change at least one of flight direction, flight speed or flight acceleration.

The invention is directed to a tracking system performing the above-noted method. The tracking system can be structured and arranged to control an interceptor missile.

The invention is directed to a system for operating the above-noted method. The system includes a measuring station, a processing-and-control unit for processing measured motion data, and at least one interceptor missile controllable by the processing-and-control unit to intercept each target object. The measuring station may include a radar measuring station, and the measured motion data comprises flight data.

The invention is directed to an interceptor missile that includes a processing unit for performing the above-noted method.

The invention is directed to a filter that includes a program for implementing the above-noted method.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

Figure 1:
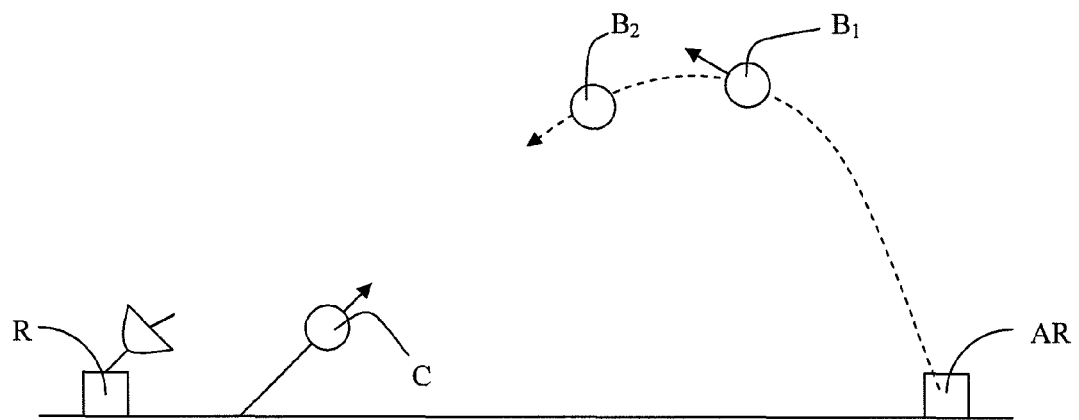
FIG. 1 schematically illustrates an intercept system that is operated with the method in accordance with the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The following examples illustrate a method with a system, in particular an air-defense system, for ascertaining a motion of a target object, in particular a ballistic missile, by using a mathematical method of estimation with the aid of a filter method relating to the model assumption for estimating the motion of the missile. The system includes a tracking system or may be designated as such. Instead of a ballistic missile, any other target object may also be considered.

In accordance with the invention, the filter method utilizes a semi-martingale-based algorithm for estimating the motion of the missile.

The invention utilizes semi-martingale theory for solving various problems.

Certain processes that, in particular, are significant for a definition of a general stochastic integral are generally designated in stochastics as semi-martingales. Processes such as Brownian motion fall under the semi-martingales. A martingale is likewise a semi-martingale in the sense of semi-martingale theory.

A probability space $(\Omega, \mathfrak{I}, P)$ with associated filtration $(\mathfrak{I}_t)$—that is to say, a filtered probability space $(\Omega, \mathfrak{I}, (\mathfrak{I}_t), P)$—will be considered. A probability space is a concept from the mathematical subdomain of probability theory. It is basically a question of a mathematical model for describing random events that are represented by the triple $(\Omega, \mathfrak{I}, P)$. In this connection, $(\Omega, \mathfrak{I})$ form a measuring space. In general, $\Omega$ denotes an outcome set, $\mathfrak{I}$ denotes the outcome sigma algebra, and P denotes a probability measure on $\mathfrak{I}$.

Let the model be given in the form of a semi-martingale, in particular a multidimensional semi-martingale. For the purpose of simplification, the theory will be elucidated on the basis of a one-dimensional integral. A semi-martingale is a stochastic process:

$$X = X_0 + A + M$$

where X is almost certainly finite and $\mathfrak{I}_0$-measurable. M is a local martingale. A is a process of finite variation. This breakdown is, in general, not uniquely defined.

Here the following holds:

$$X_t = X_0 + A_t + M_t \; (M = (M_t) \text{ is a } \mathfrak{I}_t \text{ martingale})$$

where $X_0$ is a $\mathfrak{I}_0$-measurable random variable, $A = (A_t)$ is a $\mathfrak{I}_t$-adapted stochastic process with the following representation:

$$A_t = \int a_t \text{ from 0 to t}$$

The class of the semi-martingales is stable under many operations. Many discontinuous processes are semi-martingales, since they are of limited variation.

In probability theory a martingale is a stochastic process in which the conditional expectation of an observation at time t is equal to the observation at an earlier time s.

$\{(M_t), (\Im_t)\} t \in R_+$ is a stochastic process with the set of non-negative real numbers $R_+$.

$M_t$ is called a martingale with respect to a filtration $\Im$ if $M_t$ is integrable for each $t \in T$, is adapted to the filtering $\Im$, and $E(M_t | \Im_s) = M_s$ holds for all $s \leq t$.

A Markov process (Markov chain) is a special stochastic process. The aim of the process is to specify probabilities for the occurrence of future events. The special feature of a Markov chain is the property that through knowledge of a limited previous history equally good prognoses are possible concerning the future development as in the case of knowledge of the entire previous history of the process. For the purpose of describing Markov processes, the concepts of filtration and of conditional expectation are needed. An example of a continuous Markov process is Brownian motion.

Markov chains are eminently suitable for modeling random changes of state of a system.

Figure 2:
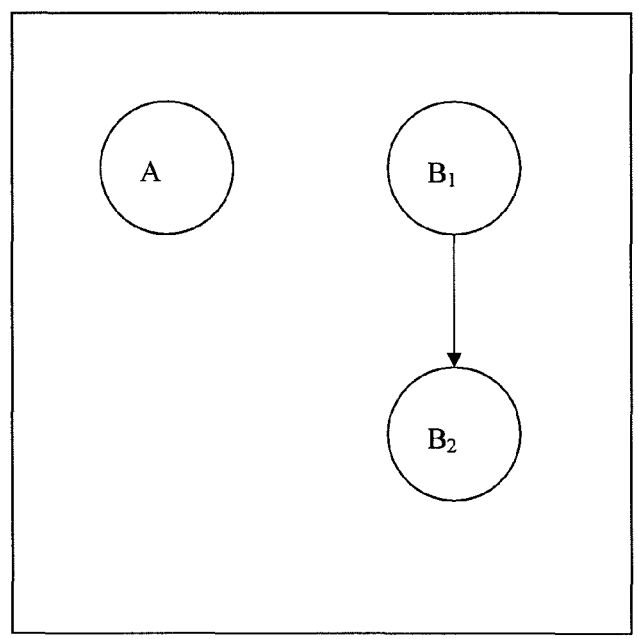
FIG. 2 schematically illustrates various flying objects.

FIG. 1 illustrates an air-defense system in respect of attacking flying objects, in particular missiles A or B. The system includes a radar measuring station for measuring missile A or B (A is represented in FIG. 2). Moreover, a processing-and-control unit, which is not shown, for processing measured motion data or flight data pertaining to missile B is present. The control unit controls the flight direction, flight speed, etc. of an interceptor missile C for intercepting the target object or, to be more precise, the ballistic missile B. Missile B is launched from a launching ramp AR. Missile C is preferably a ballistic interceptor missile C and is equipped with a device for implementing the method according to the invention. This device can include a control unit, computing unit, e.g., with a microprocessor, a guidance unit and/or a sensor unit.

The target object may, however, suddenly change its flight direction, acceleration and/or flight speed—i.e. it may suddenly enter into a change of maneuver. Therefore, a reliable prediction is needed in order to hit the target object. The system that is shown is a tracking system that is able to register a motion of an object by a model assumption according to the invention.

Important discontinuous processes are also distinguished by a smooth semi-martingale representation. Thus in the case of the discrete Markov process with transition rates $\lambda_{ik}$ the following holds:

$Y_t = Y_0 + \int \Sigma k \lambda_{Y_s, k} ds + M_t$, from 0 to t.

The associated indicator process $X = (X_t)$, $X_t = ]]Y_{t=I}$ has the following representation:

$X_t = X_0 + \int \lambda_{Y_s, i} ds + M_t$, from 0 to $t$.

For the changes of maneuver to be modeled and later to be estimated, these indicator processes prove to be particularly useful. For instance, the state Y of the discrete process may denote the state of a state automaton in the guidance algorithm/strategy of the target, or the index of one of various target configurations/types. In the multidimensional case, yet further indices or continuous model parameters may form the state vector.

The measurement in the simplest case will now be described by a stochastic differential equation, which in general is multidimensional, of the form $dZ_t = F_t dt + \sigma_t dW_t$.

Here $F = (F_t)$ and $\sigma = (\sigma_t)$ is a suitable $\Im_t$-adapted or $(\Im_t^Z)$-adapted stochastic process, so that the stochastic differential equation has a strong solution. For $\sigma_t$, in addition $\sigma_t > 0$ is assumed. In the multidimensional case the positive definiteness holds. For F, arbitrary functional dependencies of X are allowed.

The estimation of $X_t$ that is optimal with respect to the estimation variance in the case of existing measurements $(Z_{s \leq t})$ is given by the conditional expectation $E(X_t | \Im_t^Z)$. Also possible are other variants which will be considered later.

From semi-martingale theory it follows—as elucidated in greater detail in G. Kallianpur: Stochastic Filtering Theory, Springer-Verlag, New York, 1980—that the conditional expectation satisfies the following filter equation, with only the one-dimensional formula being specified here:

$dE(X_t | \Im_t^Z) = (E(a_t | \Im_t^Z) - \sigma_t^{-1}(E(X_t F_t | \Im_t^Z) - (E(X_t | \Im_t^Z) E(F_t | \Im_t^Z)) \sigma_t^{-1}(E(F_t | \Im_t^Z) dt + \sigma_t^{-1}(E(X_t F_t | \Im_t^Z) - E(X_t | \Im_t^Z) E(F_t | \Im_t^Z)) \sigma_t^{-1} dZ$ The specified filter formula is in general not sufficient for ascertaining the estimation: in general, the variables $E(a_t | \Im_t^Z)$, $E(F_t | \Im_t^Z)$, $E(X_t F_t | \Im_t^Z)$ are not known. Here, in particular, approximation methods or the (mostly infinitely) recursive ascertainment of the conditional expectations concerning the above filter equation are applied. These come into operation in respect of $a_t$, $F_t$, $X_t$, and Ft. For the most important case of the indicator processes X for the changes of maneuver that have been described, the variables are simplified to give $E(a_t | \Im_t^Z) = E(\Sigma_k \lambda_{Y_t, i}]]_{Y_t = k} | \Im_t^Z) = \Sigma_k \lambda_{ki} E(]]_{Y_t = k} | \Im_t^Z)$ $E(X_t F_t | \Im_t^Z) = E(]]_{Y_t = i} F_t | \Im_t^Z) = E(]]_{Y_t = i} F_t | \Im_t^Z, X_t)$ $E(F_t | \Im_t^Z) = \Sigma_i E(]]_{Y_t = i} F_t | \Im_t^Z)$ and are consequently easy to ascertain. Estimations may be carried out simultaneously for all states i. If these results are inserted into the filter equation, in the case of the indicator processes an explicitly solvable stochastic differential equation arises.

With the aid of the procedure that has been described, changes of maneuver, for example, can be recognized, and the interceptor missile can be controlled appropriately.

Further embodiments are possible.

In one variant a stochastic functional dependence between a model noise and measuring noise is taken into account.

If M and W are not independent of one another, the filter equation is extended by one term which includes the derivative of the quadratic covariation coefficient of the two processes. Solvability nonetheless obtains.

A multidimensional measurement and/or a multidimensional model is/are also possible. As already explained, the formulae are transferable into the multidimensional domain.

As already indicated, discontinuous processes X other than Markov processes are also possible. If, for example, X is a semi-martingale process, then the use of indicator functions of the form $]]_{Y_t = i, \tau_t > u}$ presents itself. In this connection, $\tau_t$ denotes the time that has elapsed since the last discontinuity in the process X.

If an estimating-time is not equal to a measuring-time, an inverse calculation or advance calculation, or, to be more exact, a smoothing or prediction are possible. The derivation of the filter equations for this case is undertaken in analogous manner.

In the case of a discrete sampling, the discrete sampling case can be realized by replacing the (temporally) continuous semi-martingales with (temporally) discrete semi-martingales by prediction with respect to the next measuring-times and/or by discretization of the stochastic integral.

If the filter is operated within the context of an air-defense system, the filter makes additional information available concerning the attacking missile by ascertaining the type of maneuver or other internal variables. Consequently the air-defense system is capable of communicating such additional information to the interceptor missile in addition to the trajectory data for the intercept course. The interceptor missile is thereby put in a position to optimize its guidance law with respect to the circumstances of the attacker.

FIG. 2 shows the missile B, which in this example is approaching a target ballistically. The missile B is continuously surveyed by the radar station R. Let it be known that the type of missile originates from a set of two possible types A and B. One type is a conventional ballistic missile; the other missile exhibits folding wings. The latter type is able to change its configuration by unfolding the wings at a random instant (configurations $B_1$ and $B_2$).

By way of model, use is made of, for example, a simple Markov process having three states. The associated transition diagram is represented in FIG. 2.

Figure 3:
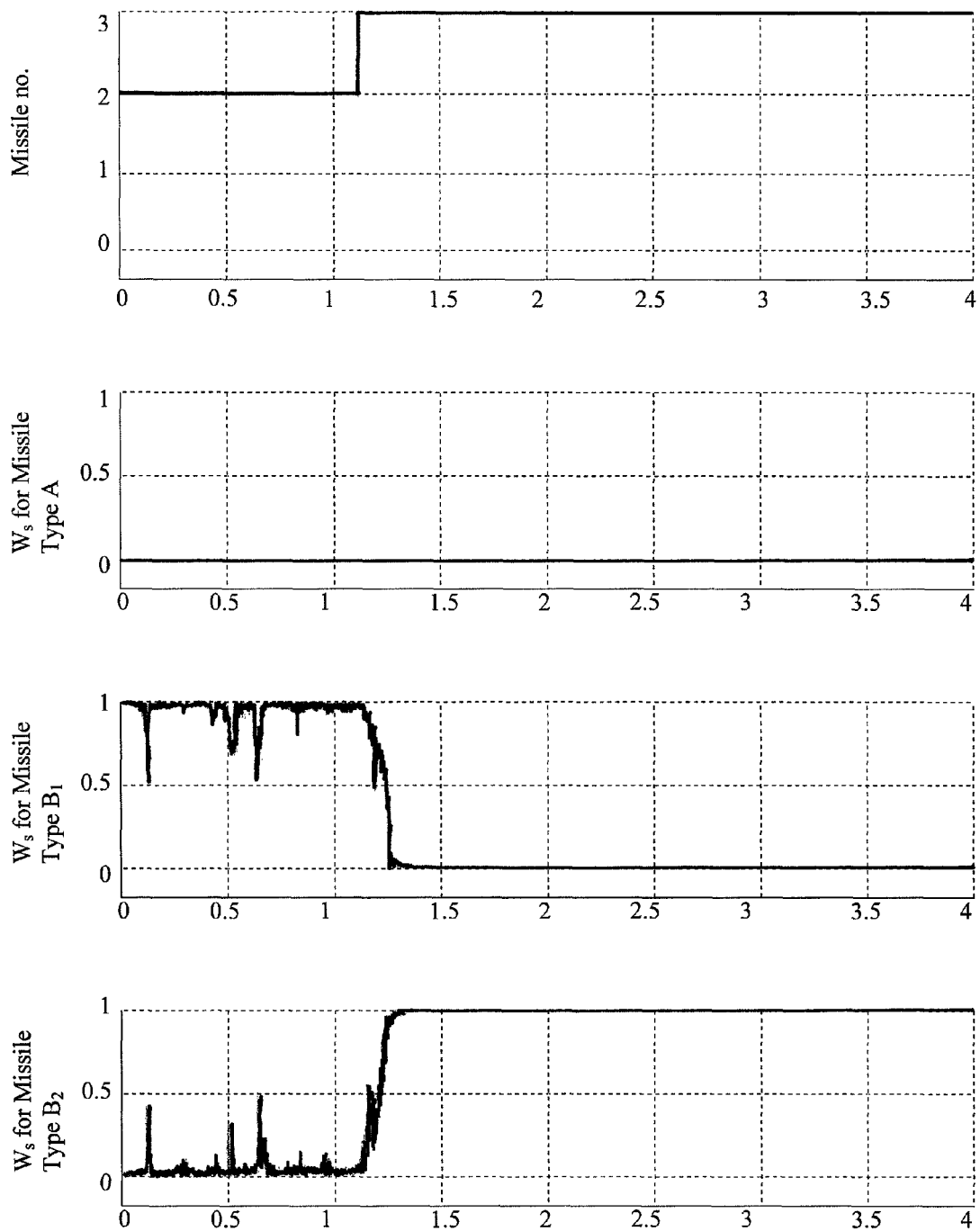
FIG. 3 illustrates probability curves with data calculated by the method in accordance with the invention in the case of two flying objects.

FIG. 3 illustrates characteristics of a filter that has been realized in accordance with the method according to the invention and that specifies a probability of a missile type and flight characteristics.

The top characteristic illustrated in FIG. 3 is identified on the y-axis as "Missile number" and represents a simulated trajectory of a missile of type B. First of all, this corresponds to the values 2 (for $B_1$) and 3 (for $B_2$), which are present on the y-axis.

The second characteristic illustrated in FIG. 3 is identified on the y-axis as "$W_s$ for missile type A" and represents a result of the filter according to the invention in the case of simulated measurements by the radar station R. In this case the conditional expectation $E(X_t|\Im_t^Z)$ specified above yields precisely the probability of the existence of one of the three possible missile configurations; by way of process X, use is made of the indicator process. As can be seen, missile A has the probability virtually zero.

The third characteristic illustrated in FIG. 3 is identified on the y-axis as "$W_s$ for missile type $B_1$" and represents the probability of the missile B with the characteristic $B_1$ (no wings).

The fourth characteristic illustrated in FIG. 3 is identified on the y-axis as "$W_s$ for missile type $B_2$" and represents the probability of the missile B with the characteristic $B_2$ (unfolded wings).

The discrimination between missiles A and $B_1$ at the start of the simulation is undertaken very quickly and can barely be discerned in the characteristics that are represented. After about 1.1 s the missile unfolds the wings, the air resistance which changes as a result leads to a change of motion, which is detected immediately.

As can be seen from the third characteristic, the probability of the existence of type $B_1$ falls, specifically to precisely zero. In analogous manner the probability of the existence of type $B_2$ rises to virtually 100%.

Because the method according to the invention is able to map random and discontinuous changes in the characteristics of the target objects—such as accelerations, for example—the accuracy of estimation of the tracking system is high and accurate. In addition, non-linearities may also arise, something which frequently occurs in practice, so that an estimation based on these methods is extremely accurate.

Accordingly, because the filter method based on semi-martingale theory permits the modeling of abrupt changes of maneuver of missile C, in the event of such maneuvers the filter that is employed does not react sluggishly and also does not react defectively.

The filter according to the invention is provided with hardware, preferably a microprocessor, and with a software program for implementing the method according to one of the preceding claims.

The invention is not restricted to this example; accordingly, other variants of semi-martingale filter equations may also be employed. The registering of other target objects is also possible. A launching ramp may also be a different launching apparatus. An interception/termination is not necessarily coupled with the tracking. In practice, it makes perfect sense to track an object without interception.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SYMBOLS

A first missile
B second missile
$B_1$ first missile (without wing)
$B_2$ first missile (with wing)
C interceptor missile
AR launching ramp
R radar station

What is claimed:

1. A method for tracking highly maneuverable moving target objects, comprising:
   estimating the motion of at least one target object via a mathematical method that includes a filter method relating to a model assumption for estimating at least one of the motion and an orientation of the target object; and
   ascertaining at least one of the motion and orientation by modeling with:
   stochastic differential equations; and
   a discontinuous process comprising one of a Markov process or semi-Markov process, in which the at least one of the motion and orientation are determined by a numerical method,
   wherein the filter method includes a semi-martingale algorithm for estimating motion.

2. The method in accordance with claim 1, wherein the semi-martingale algorithm is an algorithm based on model equations representable by smooth semi-martingales.

3. The method in accordance with claim 1, wherein one stochastic differential equation comprises:

$$dZ_t = F_t dt + \sigma_t dW_t$$

where

F and σ represent an adapted stochastic process,

Z represents a measurement or a measured value, and

W represents a Brownian motion.

4. The method in accordance with claim 3, further comprising using indicator processes X of the form $X_1 = \mathbb{1}_{Yt=i}$ or $X_t = \mathbb{1}_{Yt=i, \text{additional condition}}$ of a discontinuous process Y that is usable for modeling according to the equation:

$$X_t = X_0 + \int \lambda_{Ys,i} ds + M_t, \text{ from 0 to } t$$

where

X is an indicator process,

λ represents a transition rate,

M represents a martingale, and

Y represents such a Markov process.

5. The method in accordance with claim 4, further comprising:

assigning to at least one of a state in a state automaton in a computer of the target object and an index of types or configuration of target objects, a state Y of the discontinuous process.

6. The method in accordance with claim 4, wherein a conditional expectation of a drift process F of the model is ascertainable via the indicator process comprising, $$E(F_t | \mathfrak{S}_t^Z) = \Sigma_i E(\mathbb{1}_{Yt=i} F_i | \mathfrak{S}_t^Z)$$

where $\mathfrak{S}_t^Z$ is the filtration generated by the measurement Z.

7. The method in accordance with claim 1, wherein the stochastic differential equations describe a probability of an existence of a certain maneuver of the target object.

8. The method in accordance with claim 7, wherein the target object comprises a flying target object.

9. The method in accordance with claim 1, wherein the target object comprises a missile, and an interceptor missile is controlled by the method.

10. The method in accordance with claim 1, wherein the motion is discontinuous.

11. The method in accordance with claim 1, wherein the target object changes at least one of flight direction, flight speed or flight acceleration.

12. A tracking system performing the method in accordance with claim 1.

13. The tracking system in accordance with claim 12 being structured and arranged to control an interceptor missile.

14. A system for operating the method of claim 1, comprising:

a measuring station;

a processing-and-control unit for processing measured motion data; and at least one interceptor missile controllable by the processing-and-control unit to intercept each target object.

15. The system in accordance with claim 14, wherein the measuring station comprises a radar measuring station, and the measured motion data comprises flight data.

16. An interceptor missile comprising a processing unit for performing the method of claim 1.

17. A filter comprising a program for implementing the method of claim 1.

18. A method for tracking highly maneuverable moving target objects, comprising:

estimating the motion of at least one moving target object via a mathematical method that includes a filter method relating to a model assumption for estimating at least one of the motion and an orientation of the target object;

ascertaining at least one of the motion and orientation of the at least one target object by modeling with:

stochastic differential equations; and a discontinuous process comprising one of a Markov process or semi-Markov process, in which the at least one of the motion and orientation are determined by a numerical method; and intercepting the at least one target object, wherein the filter method includes a semi-martingale algorithm for estimating motion.

19. A method for tracking highly maneuverable moving target objects, comprising:

estimating the motion of at least one target object during flight via a mathematical method that includes a filter method relating to a model assumption for estimating at least one of the motion and an orientation of the target object;

ascertaining at least one of the motion and orientation of the at least one target object by modeling with:

stochastic differential equations; and a discontinuous process comprising one of a Markov process or semi-Markov process, in which the at least one of the motion and orientation are determined by a numerical method; and intercepting the at least one target object with an interceptor missile, wherein the filter method includes a semi-martingale algorithm for estimating motion, and wherein the semi-martingale algorithm is an algorithm based on model equations representable by smooth semi-martingales.

* * * * *